US008098591B2

(12) United States Patent
Roberts (10) Patent No.: US 8,098,591 B2
(45) Date of Patent: Jan. 17, 2012

(54) SELECTIVELY ASSIGNING MOBILE STATIONS TO SEGMENTED ZONES

(75) Inventor: Harold A. Roberts, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 351 days.

(21) Appl. No.: 12/547,968

(22) Filed: Aug. 26, 2009

(65) Prior Publication Data

US 2011/0051673 A1 Mar. 3, 2011

(51) Int. Cl.
*G01R 31/08* (2006.01)
*H04W 4/00* (2009.01)
*H04J 1/00* (2006.01)
*H04J 3/16* (2006.01)

(52) U.S. Cl. ........ 370/252; 370/329; 370/343; 370/437; 370/468

(58) Field of Classification Search .................. None
See application file for complete search history.

(56) References Cited

U.S. PATENT DOCUMENTS

| | | | |
|---|---|---|---|
| 5,870,666 A | 2/1999 | Tanaka et al. | |
| 7,983,664 B2 | 7/2011 | Suga | |
| 8,010,161 B2 * | 8/2011 | Umeda et al. | 455/561 |
| 2009/0197623 A1 | 8/2009 | Oota | |
| 2009/0245172 A1 * | 10/2009 | Sato | 370/328 |
| 2009/0247171 A1 * | 10/2009 | Suga | 455/447 |
| 2009/0258621 A1 * | 10/2009 | Silvola et al. | 455/226.3 |
| 2011/0070911 A1 | 3/2011 | Zhang et al. | |
| 2011/0194423 A1 | 8/2011 | Cho et al. | |

OTHER PUBLICATIONS

"Fractional Frequency Reuse in Mobile WiMAX", "available at http://www.conniq.com/WiMAX/fractional-frequency-reuse.htm", Aug. 14, 2006, Publisher: Conniq.com.
Fangmin, Xu et al., "Soft Fractional Frequency Reuse", "TDD Technlogy and Future Mobile Communications", Sep. 27, 2007 , vol. 15, No. 3, Publisher: ZTE Communications.
"Soft Frequency Reuse Scheme for UTRAN LTE", May 6, 2005, Publisher: 3GPP TSG RAN WG1 Meeting #41, Published in: Athens, Greece.
Necker, Mark C., "Local Interference Coordination in Cellular OFDMA Networks", "Proceedings of the 66th IEEE Vehicular Technology Conference", 2007, Publisher: VTC 2007—Fall, Published in: Baltimore, MA.
Zhou, Yuefeng and N. Zein, "Simulation Study of Fractional Frequency Reuse for Mobile WiMAX", "VTC Spring 2008: Vehicular Technology Conference", May 11-14, 2008, pp. 2592-2595, Publisher: IEEE.

* cited by examiner

*Primary Examiner* — Nittaya Juntima
(74) *Attorney, Agent, or Firm* — Fogg & Powers LLC (57) ABSTRACT

A base station includes a transceiver, memory, and processor. The transceiver communicates with mobile stations. The memory stores a database of threshold CINR values. The processor implements a scheduling module. The transceiver receives a request to connect from a mobile station. The scheduling module obtains actual CINR and RSSI values for the mobile station. The scheduling module compares the actual CINR value with a threshold CINR value retrieved from the database based on the actual RSSI value. When the actual CINR value is greater than the threshold CINR value for the actual RSSI value, the scheduling module assigns the mobile station one or more subcarriers from a fully used zone of subcarriers. When the actual CINR value is not greater than the threshold CINR value for the actual RSSI value, the scheduling module assigns the mobile station one or more subcarriers from a segmented zone of subcarriers.

20 Claims, 8 Drawing Sheets

SELECTIVELY ASSIGNING MOBILE STATIONS TO SEGMENTED ZONES

CROSS-REFERENCE TO RELATED APPLICATION

This application is related to U.S. patent application Ser. No. 12/547,987, filed on even date herewith, entitled "SELECTIVELY MANAGING MOBILE STATION SUBSCRIPTIONS BETWEEN FULLY USED ZONES AND SEGMENTED ZONES", and which is incorporated herein by reference in its entirety.

BACKGROUND

Orthogonal frequency division multiple access (OFDMA) systems, such as Institute of Electrical and Electronics Engineers (IEEE) 802.16e, Worldwide Interoperability for Microwave Access (WiMAX), and Long Term Evolution (LTE), are susceptible to co-channel interference when operating at or near maximum capacity with a finite amount of radio frequency (RF) channels available in the usable spectrum. Because of the limited number of available radio frequencies in the spectrum, it is advantageous to use frequencies efficiently. The efficiency of frequency usage in an OFDMA network is called spectral efficiency.

Co-channel interference occurs when OFDMA base stations in close proximity to one another operate on the same channel frequency due to limited available radio frequency channels in the spectrum. This interference is typically more pronounced at the cell edges and may be experienced in the uplink or the downlink.

Some proposed OFDMA systems implement an approach for mitigating co-channel interference at the cell boundary referred to as fractional frequency reuse (FFR). However, one problem common to the fractional frequency reuse schemes proposed so far is finding ways to effectively determine how mobile stations should be assigned to the segmented zones. For the reasons stated above and for other reasons stated below which will become apparent to those skilled in the art upon reading and understanding the specification, there is a need in the art for systems and methods for selectively assigning mobile stations to segmented zones.

SUMMARY

The Embodiments of the present invention provide methods and systems for selectively assigning mobile stations to either a fully used zone or a partially used zone on a base station and will be understood by reading and studying the following specification.

A base station includes a transceiver, memory, and processor. The transceiver communicates with mobile stations. The memory stores a database of threshold CINR values. The processor implements a scheduling module. The transceiver receives a request to connect from a mobile station. The scheduling module obtains actual CINR and RSSI values for the mobile station. The scheduling module compares the actual CINR value with a threshold CINR value retrieved from the database based on the actual RSSI value. When the actual CINR value is greater than the threshold CINR value for the actual RSSI value, the scheduling module assigns the mobile station one or more subcarriers from a fully used zone of subcarriers. When the actual CINR value is not greater than the threshold CINR value for the actual RSSI value, the scheduling module assigns the mobile station one or more subcarriers from a segmented zone of subcarriers.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Embodiments of the present invention address the problems in mobile communications associated with assigning channels to mobile stations within a cell. With embodiments of the present invention, a base station for the cell will assign a mobile station to either a fully used zone or a segmented zone based on a combination of carrier to interference and noise ratio (CINR) values, received signal strength indication (RSSI) values, and packet error rate (PER) percentages, as explained more particularly below.

Figure 1A:
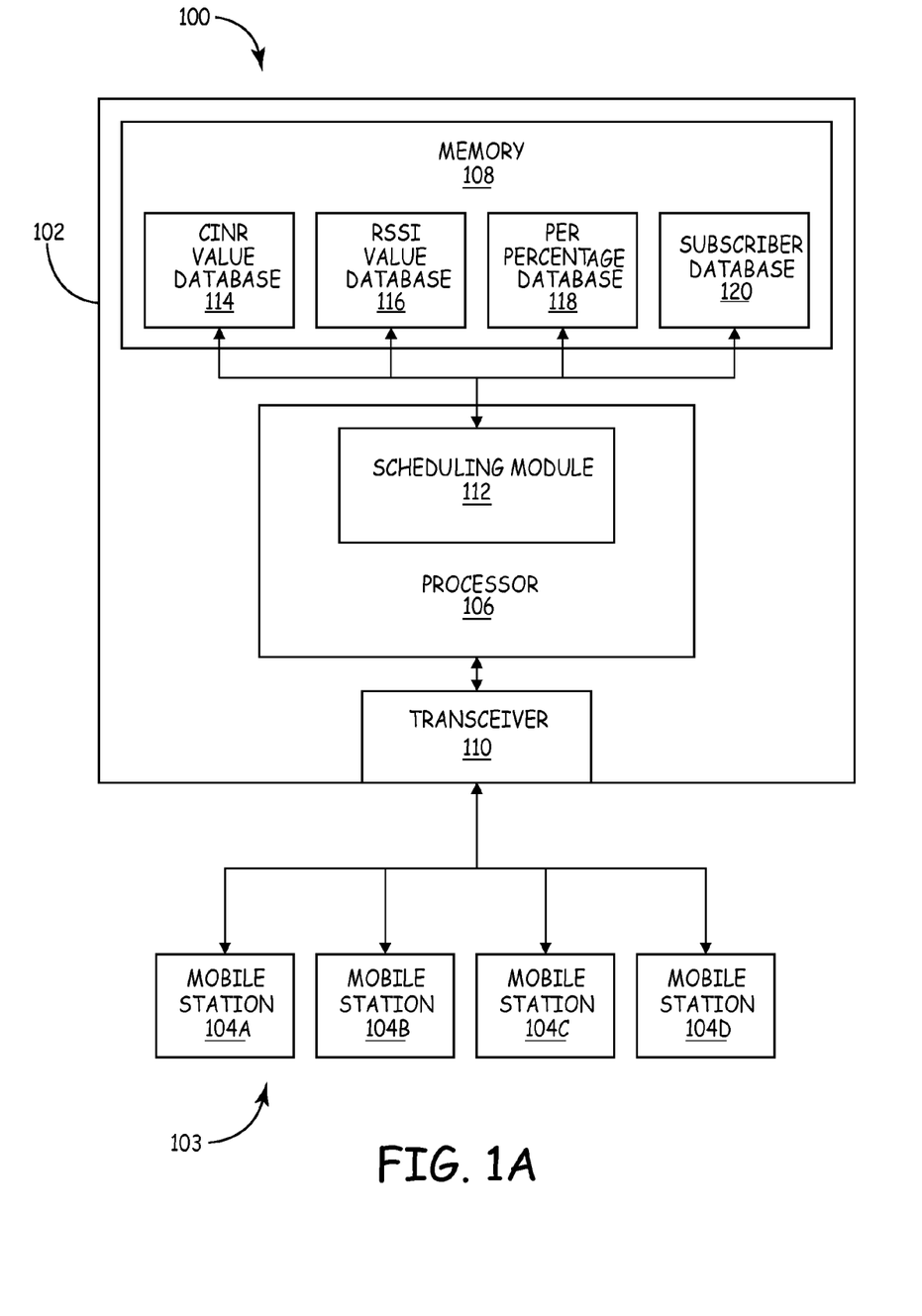
FIG. 1A is a block diagram showing a radio communication system for assigning channels to mobile stations of one embodiment of the present invention.

FIG. 1A is a block diagram showing a radio communication channel system 100 of one embodiment of the present invention. System 100 includes a base station 102 and a plurality of mobile stations shown generally at 103, and represented in FIG. 1 by mobile stations 104A-D. In other embodiments, greater or fewer mobile stations are included in mobile stations 103. Mobile stations 103 are wirelessly and communicatively coupled to base station 102.

Base station 102 includes at least one processor 106 coupled to at least one memory 108, and at least one transceiver 110. In the particular embodiment shown in FIG. 1A, Transceiver 110 is a radio device for establishing bidirectional wireless communication links with mobile stations 104A-D using orthogonal frequency-division multiple access (OFDMA) communication. Embodiments of the present application are not however limited to OFDMA communications. In other embodiments, transceiver 110 implements other communication schemes for communicating with mobile stations 104A-D.

In the particular embodiment shown in FIG. 1A, processor 106 is illustrated as a single component processor device, such as a microprocessor. In other embodiments, processor 106 may be implemented using combinations of individual discrete or integrated circuit components. Base station 102 further comprises a scheduling module 112. In the embodiment shown in FIG. 1A, scheduling module 112 is a software module realized through processor 106 by executing software instruction code. The instruction code for scheduling module 112 may alternately reside on base station 102 as firmware, or otherwise implemented, such as in the particular configuration of a field programmable gate array (FPGA) or application-specific integrated circuit (ASIC).

Scheduling module 112 assigns wireless channels to each of mobile stations 104A-D for the purpose of facilitating bi-directional communication between the base station 102 and the mobile stations 104A-D. For example, for a WiMAX/OFDMA scheme, scheduling module 112 will allocate to each of the mobile stations 104A-D a channel that would comprise a set of OFDM channels (also known as sub-channels, sub-carriers or tones) for a particular duration of time. Using embodiments of the present invention, such allocation of channels is determined based on parameters commonly referred to by those of ordinary skill in the art as carrier to interference and noise ratio (CINR) values, received signal strength indication (RSSI) values, and packet error rate (PER) percentages, as explained more particularly below.

CINR values are measurements of both noise, such as thermal noise and other types of noise, and interference in the signal sent from base station 102 to mobile stations 103. As would be recognized by one of ordinary skill in the art, calculation of the CINR values discussed herein are readily determined as described in sections 8.1 to 8.4 of IEEE Std 802.16-2004, which is herein incorporated by reference. CINR values are typically expressed in decibels, although the particular units used to measure CINR values is not pertinent to this invention. CINR values are typically measured at mobile stations 103 as well as base stations. In order for mobile stations 103 to accurately and efficiently decode the received signal sent from base station 102, the signal should have a CINR value above a predetermined threshold value. This predetermined threshold value varies depending on the radio frequency modulation being used, such as QPSK, QAM16, or QAM64.

RSSI values are measurements of the power received by the mobile stations 103 in a radio signal sent from the base station 102. As would be recognized by one of ordinary skill in the art, calculation of the RSSI values discussed herein are readily determined as described in sections 8.1 to 8.4 of IEEE Std 802.16-2004, which is herein incorporated by reference. RSSI values are typically expressed in decibels referenced to one milliwatt (dBm), though RSSI values are also sometimes expressed in milliwatts or in arbitrary units. Such as with the CINR values, the particular units used to measure RSSI values is not pertinent to this invention.

PER percentages indicate the percentage of packets sent from base station 102 to mobile stations 103 that are not received by mobile stations 103. PER percentages are used to test the performance of mobile stations 103. PER percentages are typically ratios (expressed as percentages) of the number of packets sent from base station 102 to, but not successfully received at a particular individual mobile station of mobile stations 103 (i.e., the number of failed packet transmissions) compared to the total number of packets sent from base station 102 to the particular individual mobile station of mobile stations 103. Such as with the CINR and RSSI values, the particular units used to measure PER percentages is not pertinent to this invention.

Scheduling module 112 assigns channels to mobile stations 104A-D based on corresponding CINR values and RSSI values. In operation, base station 102 will receive a ranging request from a mobile station, such as mobile station 104A for example, to subscribe to a particular sector (channel) of base station 102. After successful ranging and registration, a request for bandwidth from the mobile station is provided by base station 102 to scheduling module 112. Scheduling module 112 then determines which, if any, OFDM channels to allocate to mobile station 104A while avoiding co-channel interference from neighboring OFDMA base stations utilizing the same frequency band.

Figure 1B:
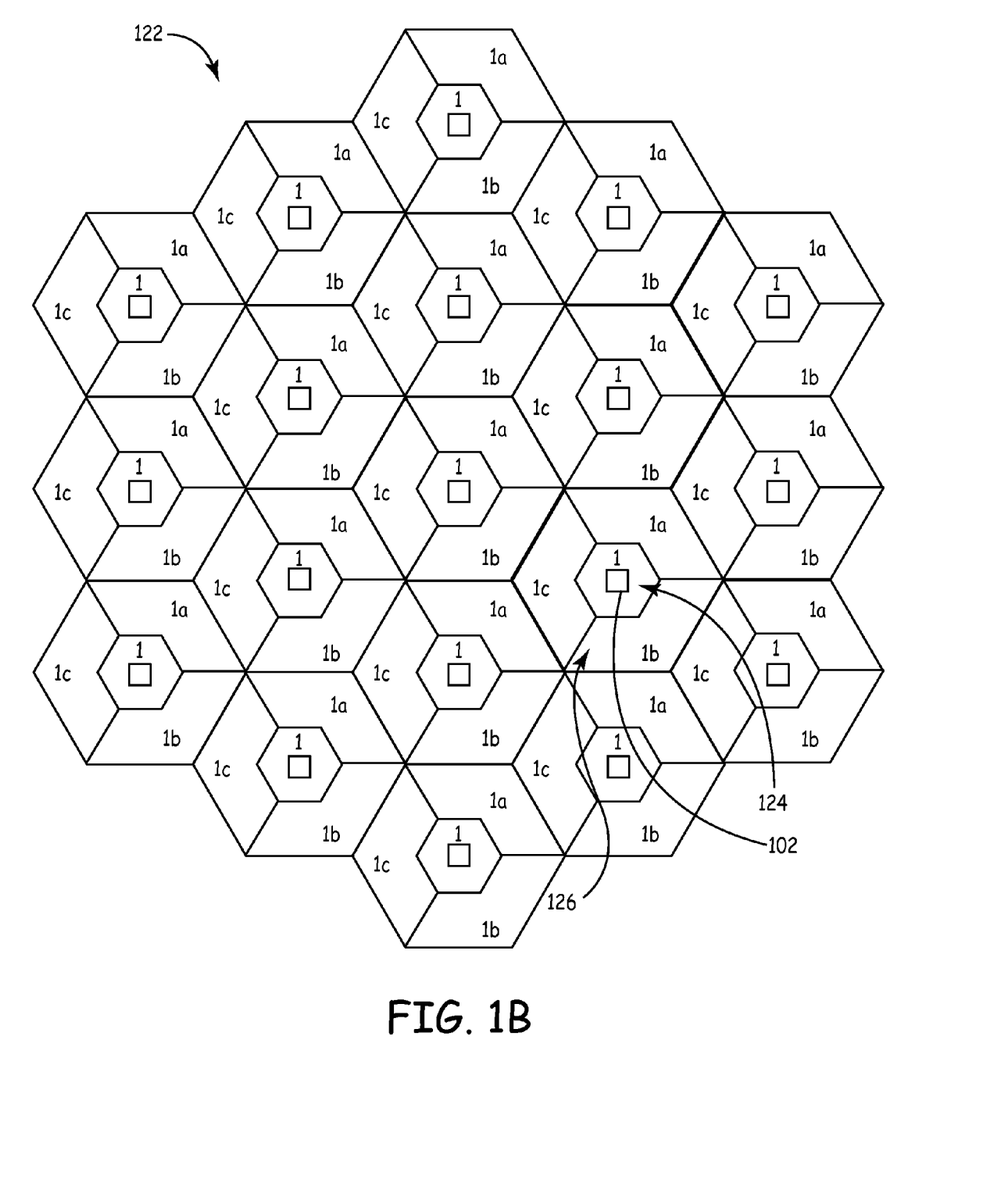
FIG. 1B is a diagram of a network of base stations, including the base station of FIG. 1A.

FIG. 1B is a diagram of a network 122 of base stations, including base station 102. Network 122 is based on a typical three sector topology cell site where only one channel is available. Each of the base stations in network 122 include a base station similar to base station 102 and mobile stations similar to mobile stations 103. Base station 102, along with each other base station in network 122, has a fully used zone (shown for example at zone 124) and a segmented zone (shown for example at zone 126). Fully used zone 124 and segmented zone 126 are shown such that base station 102 sits in the center of fully used zone 124 and segmented zone 126 surrounds fully used zone 124. Segmented zone 126 is divided into three segments, labeled 1a, 1b, and 1c on FIG. 1B. The three segments of segmented zone 126 extend to the cell boundary and are adjacent to the segmented zones of other cells. Though network 122 shown in FIG. 1B includes base station 102 and 18 other base stations configured similarly to base station 102, other embodiments of network 122 include greater or fewer base stations configured similarly to base station 102, with single or multiple channels available.

Network 122 is designed to implement fractional frequency reuse using the improved methods provided by embodiments of the present invention by assigning mobile stations 103 into either a fully used zone 124 or a segmented zone 126 associated with base station 102 based on CINR values. The channel segmentation found in segmented zone 126 reduces the segmented zone's bandwidth to about ⅓ of the bandwidth of fully used zone 124, because only about ⅓ of the sub-channels are available for allocation in each of segments 1a, 1b, and 1c. Though the cells in network 122 are shown as hexagons, other embodiments include differently shaped cells. Though there are no gaps or overlaps shown between cells in network 122, typically the sectors in network 122 are not perfectly matched, but include gaps and overlaps between cells and sectors.

Each of the three segments, 1a, 1b, and 1c of segmented zone 126 do not touch a segment of the same type. Specifically, the segment 1a from segmented zone 126 of the cell surrounding base station 102 is adjacent to a segment 1b and 1c from adjacent cells, but is not adjacent to a segment 1a from an adjacent cell. In addition, the segment 1b from segmented zone 126 of the cell surrounding base station 102 is adjacent to a segment 1a and 1c from adjacent cells, but is not adjacent to a segment 1b from an adjacent cell. In addition, the segment 1c from segmented zone 126 of the cell surrounding base station 102 is adjacent to a segment 1a and 1b from adjacent cells, but is not adjacent to a segment 1c from an adjacent cell. This pattern is consistent throughout network 122. In other embodiments, the pattern varies throughout the network.

Though fully used zone 124 and segmented zone 126 are shown as being spatially defined in FIG. 1B, in practice, fully used zone 124 and segmented zone 126 will be defined based on the relative CINR values, RSSI values, and PER percentages of mobile stations 103. Thus, while a mobile station 104A spatially positioned near a cell boundary is typically placed into segmented zone 126 and a mobile station 104B spatially positioned near base station 102 is typically placed into fully used zone 124, this is not always the case because proximity to the base station is not the underlying determining factor. With embodiments of the present invention, a mobile station 103A spatially near base station 102 will be assigned into segmented zone 126 based on whether the relationship between the CINR values and the RSSI values for that mobile station 104A or the relationship between the PER percentages and the RSSI values for that mobile station 104A indicate they should be. A mobile station (for example 104B) that is spatially distant from base station 102 will be assigned into fully used zone 124 if the relationship between the CINR values and the RSSI values or the relationship between the PER percentages and the RSSI values for mobile station 104B indicates it should be.

Scheduling module 112 performs the function of determining whether to assign each of mobile stations 104A-D into fully used zone 124 or segmented zone 126. Once scheduling module 112 determines where to assign mobile station 104A (for example), mobile station 104A is subscribed to the corresponding zone and scheduling module 112 stores data regarding where mobile station 104A is subscribed in memory 108.

In one embodiment, memory 108 of base station 102 includes a CINR value database 114, a RSSI value database 116, a PER percentage database 118, and a subscriber database 120. CINR value database 114 is a database of CINR values for mobile stations 103. CINR value database 114 is constantly updated as transceiver 110 receives CINR value updates from mobile stations 103. RSSI value database 116 is a database of RSSI values for mobile stations 103. PER percentage database 118 is a database of PER percentages for mobile stations 103. PER percentage database 118 typically contains a table of threshold PER percentages including RSSI and various modulation and coding types, such as QAM (including, but not limited to QAM64 ½, QAM16 ¾, and QAM 16 ½—the fractions indicating coding rates), and QPSK (including, but not limited to QPSK ½—the fraction indicating a coding rate). Subscriber database 120 is a database containing information about which mobile stations 103 are subscribed to which zone. In other example embodiments, a single database contains all the information of CINR value database 114, RSSI value database 116, PER percentage database 118, and subscriber database 120. In other example embodiments, other amounts and combinations of databases are used. Also, depending on which of the particular methodologies are used (described below) memory 108 need only include the combination of CINR value database 114, a RSSI value database 116, a PER percentage database 118 required by the methodology.

Three methodologies of using two or more metrics to determine whether to assign mobile stations 103 to fully used zone 124 or partially used zone 126 will be discussed in various embodiments detailed in this disclosure. The first methodology uses the correlation between CINR and RSSI as a metric in determining whether to subscribe a particular mobile station, such as mobile station 104A for example, to fully used zone 124 or partially used zone 126. The second methodology uses the correlation between PER and RSSI as a metric in determining whether to subscribe a particular mobile station, such as mobile station 104A for example, to fully used zone 124 or partially used zone 126. The third methodology uses both the correlation between CINR and RSSI and the correlation between PER and RSSI as metrics in determining whether to subscribe a particular mobile station, such as mobile station 104A for example, to fully used zone 124 or partially used zone 126. Specific embodiments of methods implementing these methodologies are discussed below.

In a first set of embodiments using the correlation between CINR values and RSSI values as a metric, a scheduling module (such as scheduling module 112, for example) creates functions comparing CINR values to RSSI values. Specifically, actual CINR values are compared to actual RSSI values by a first CINR/RSSI function and threshold CINR values are compared to actual RSSI values by a second CINR/RSSI function. The CINR values are typically retrieved from CINR value database 114 and the RSSI values are typically retrieved from RSSI value database 116. In example embodiments, the base station queries CINR and RSSI values and then determines the which zone to assign the mobile station. A new query is periodically sent out to determine whether to remain in the selected zone or to reassign. In some embodiments, a database is not used at all and the CINR and RSSI values are queried when necessary.

In a second set of embodiments using the correlation between PER percentages and RSSI values as a metric, a scheduling module (such as scheduling module 112, for example) creates functions comparing PER percentages to RSSI values. Specifically, actual PER percentages are compared to actual RSSI values by a first PER/RSSI function and threshold PER percentages are compared to actual RSSI values by a second PER/RSSI function. The PER percentages are typically retrieved from PER percentage database 118 and the RSSI values are typically retrieved from RSSI value database 116.

In a third set of embodiments using both the correlation between CINR values and RSSI values and the correlation between PER percentages and RSSI values as metrics, a scheduling module (such as scheduling module 112, for example) creates functions comparing CINR values to RSSI values and functions comparing PER percentages to RSSI values. Specifically, actual CINR values are compared to actual RSSI values by a first CINR/RSSI function and threshold CINR values are compared to actual RSSI values by a second CINR/RSSI function. The CINR values are typically retrieved from CINR value database 114 and the RSSI values are typically retrieved from RSSI value database 116. In addition, actual PER percentages are compared to actual RSSI values in a first PER/RSSI function and threshold PER percentages are compared to actual RSSI values in a second PER/RSSI function. The PER percentages are typically retrieved from PER percentage database 118 and the RSSI values are typically retrieved from RSSI value database 116.

As the terms are used in this specification, "actual CINR value" and "actual RSSI value" and "actual PER value" are values that are measured, calculated or estimated (or otherwise determined) and represent the current or recent state of these three respective parameters for the particular mobile station.

Base station 102 typically updates the CINR values stored in CINR value database 114 for any of mobile stations 104A-D subscribed to base station 102 by sending out a CINR update request to all of mobile stations 103 subscribed to base station 102. The CINR update responses would then be received by base station 102 from any of mobile stations 103 subscribed to base station 102. In one embodiment, CINR update responses are received through a dedicated channel, such as a channel quality indicator channel. The channel quality indicator channel is used to quickly and efficiently query CINR values and other measurements. In other embodiments, base station 102 only updates the CINR values stored in CINR value database 114 when base station 102 receives a connection request from mobile stations 103.

CINR measurement values can change based on the movement of mobile stations 103 as well as the movement of other objects, such as a truck driving down a road, a plane flying overhead, or trees moving in the wind. Thus, it is advantageous for scheduling module 112 to request and receive updated CINR values and other measurements relatively often, so that scheduling module 112 can make determinations with updated and accurate information. Typically, CINR value database 114 includes recent measurements of relative CINR values for each of subscribed mobile stations 103. Specifically, CINR value database 114 includes a CINR value for fully used zone 124 and a CINR value for segmented zone 126 for each of subscribed mobile stations 103.

As with CINR value database 114, RSSI value database 116 and the PER percentages database are typically automatically updated periodically after a request from scheduling module 112. In other embodiments, a separate updating module keeps CINR value database 114, RSSI value database 116, and PER percentage database 118 updated. Scheduling module 112 also keeps track of which mobile stations 103 are subscribed into fully used zone 124 and which mobile stations 103 are subscribed into segmented zone 126 by tracking each of mobile stations 103 in subscriber database 120.

In some embodiments, scheduling module 112 keeps records of which zone each of mobile stations 103 has been subscribed to in the past, even when particular mobile stations 103 are no longer subscribed to either fully used zone 124 or segmented zone 126. As such, a history is created for each mobile station, the subcarriers they have used, and CINR, RSSI and PER values. In example embodiments, these past records are used to create assumptions of where each of mobile stations 103 should be assigned if it ever requests another connection to base station 102. Specifically, if a particular mobile station from mobile stations 103 was earlier connected to the fully used zone 124, the assumption will be that it will connect to the fully used zone 124 again, unless the measurements indicate otherwise. Similarly, if a particular mobile station from mobile stations 103 was earlier connected to the partially used zone 126, the assumption will be that it will connect to the partially used zone 126 again, unless the measurements indicate otherwise. The databases can be linked to the databases of other base stations to further enhance the functionality and accuracy of assignments. Specifically, information from the databases of other base stations about which zone a particular mobile station from mobile stations 103 typically connects or what the last measured CINR values, RSSI values, or PER percentages for the particular mobile station were at another base station, may be used as a starting point or as a way of biasing the determination of which zone to assign the particular mobile station. In some embodiments, there are greater or fewer databases than described here. In other embodiments, there are no databases and the actual values are received and processed upon a query from the base station 102.

Generally, scheduling module 112 concludes there is no interference for a mobile station (mobile station 104C for example) if the CINR value for fully used zone 124 and the CINR value for segmented zone 126 are the same for that mobile station. In this case, scheduling module 112 would assign mobile station 104C to the fully used zone. Thus, mobile station 104C is able to utilize all the sub-channels. Several example methods of determining which zone to place each of mobile stations 104A-D will be discussed in detail below.

In some cases, scheduling module 112 assigns mobile station 104C to the segmented zone because scheduling module 112 detects that mobile station 104C is being interfered with. In some cases, assigning mobile station 104C to segmented zone 126 causes base station 102 to use the less efficient quadrature phase-shift keying (QPSK) modulation with mobile station 104C, instead of the more efficient quadrature amplitude modulation (QAM). QAM16 is generally twice as efficient as QPSK. Though QAM16 ½ is twice as efficient as QPSK ½ (where ½ indicates the level of forward error correction coding used), mobile station 104C would have access to three times as many channels by using QPSK ½ in fully used zone 124 instead of using QAM16 ½ in segmented zone 126. In this case, the extra channels available in fully used zone 124 more than offset the reduced efficiency of QPSK ½ compared to QAM16 ½. In other examples, other types of modulation are used in fully used zone 124 and segmented zone 126.

In example embodiments and because of a switch to QPSK modulation, or for other reasons, base station 102 is not able to give mobile station 104C the uplink bandwidth that was guaranteed to the user of mobile station 104C through a service contract. In some cases, scheduling module 112 assigns mobile station 104C to the fully used zone even though mobile station 104C is experiencing interference, so that mobile station 104C gets a particular uplink bandwidth or other level of service guaranteed to it in a contract.

Once the scheduling module 112 makes its determinations, the subcarrier assignment is communicated to the requesting mobile station. That is, the mobile station is instructed to configure itself to communicate with the base station on the assigned subcarriers.

In example embodiments, where transceiver 110 implements a multiple-input and multiple-output (MIMO) system, there will be two RSSI levels stored in the RSSI value database, one for each antenna. In embodiments implementing maximum ratio combining (MRC) and space time coding (STC) systems, there will be a single CINR value stored in the CINR value database for the entire channel after MIMO processing. The two actual power levels (in milliwatts) should be summed or combined in some manner and used to compare to the expected CINR value stored in the CINR value database. In others embodiments of MIMO systems there will be two CINR values stored in CINR value database 114 for each mobile station, one per antenna.

Figure 2:
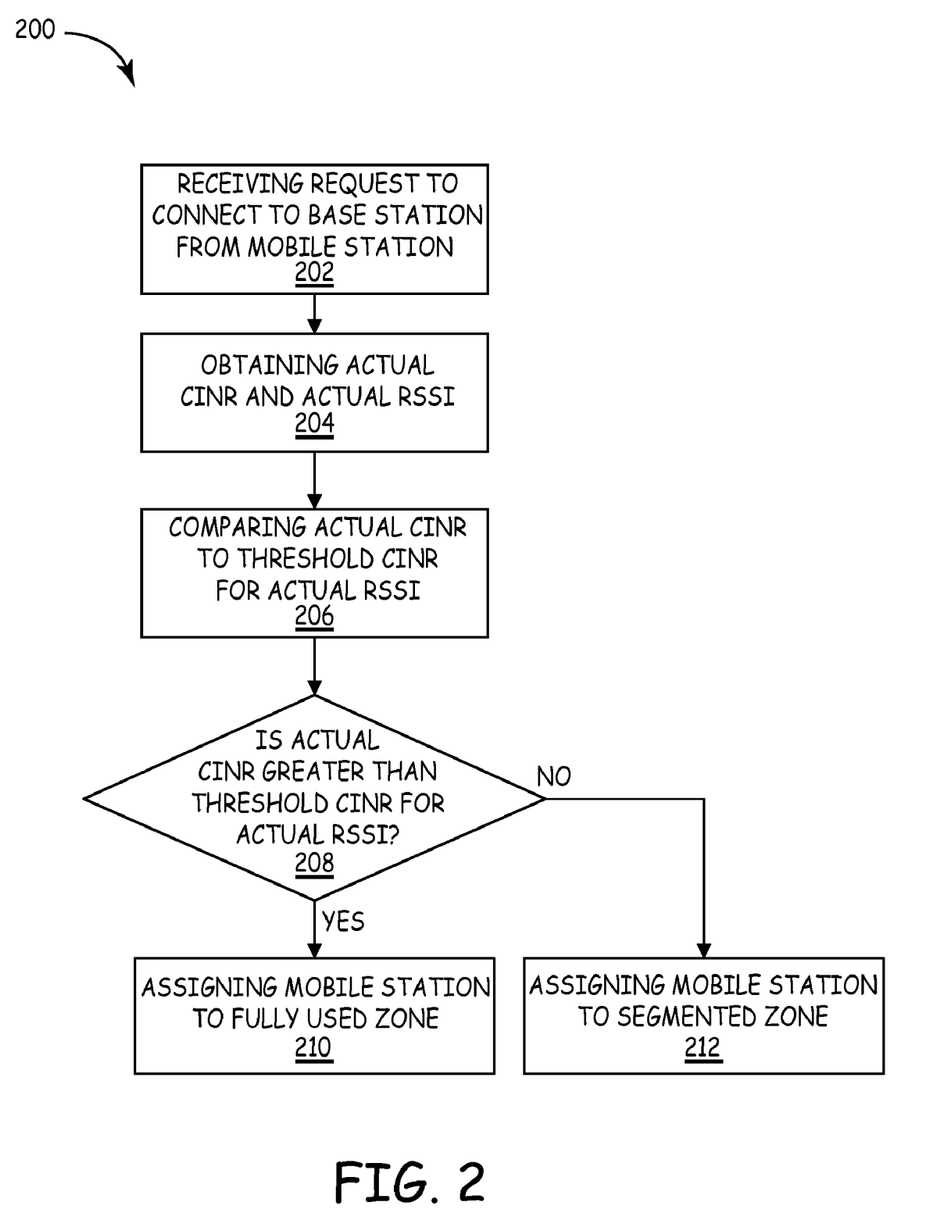
FIG. 2 is a flow diagram showing an example method of assigning mobile stations to either a fully used zone or a segmented zone of a base station using CINR values combined with RSSI values according to the present disclosure.

FIG. 2 is a flow diagram showing an example method 200 for assigning mobile stations to either a fully used zone or a segmented zone of base station based on a comparison of the function of CINR values combined with RSSI values. Using CINR values as a metric, a mobile station is likely subject to some kind of interference if its CINR value is low. Using RSSI values as a metric, a mobile station is likely to be at a border of a sector if its RSSI value is low. Method 200 utilizes CINR values and RSSI values to derive a CINR verses RSSI curve (referred to herein as a "CINR/RSSI function") which may be used as a metric for assigning mobile stations. That is, in the absence of interference, the CINR/RSSI function of the CINR values and RSSI values creates a linear curve. As interference increases, the curve of the CINR/RSSI function becomes less linear. This relationship is illustrated in FIG. 3.

Figure 3:
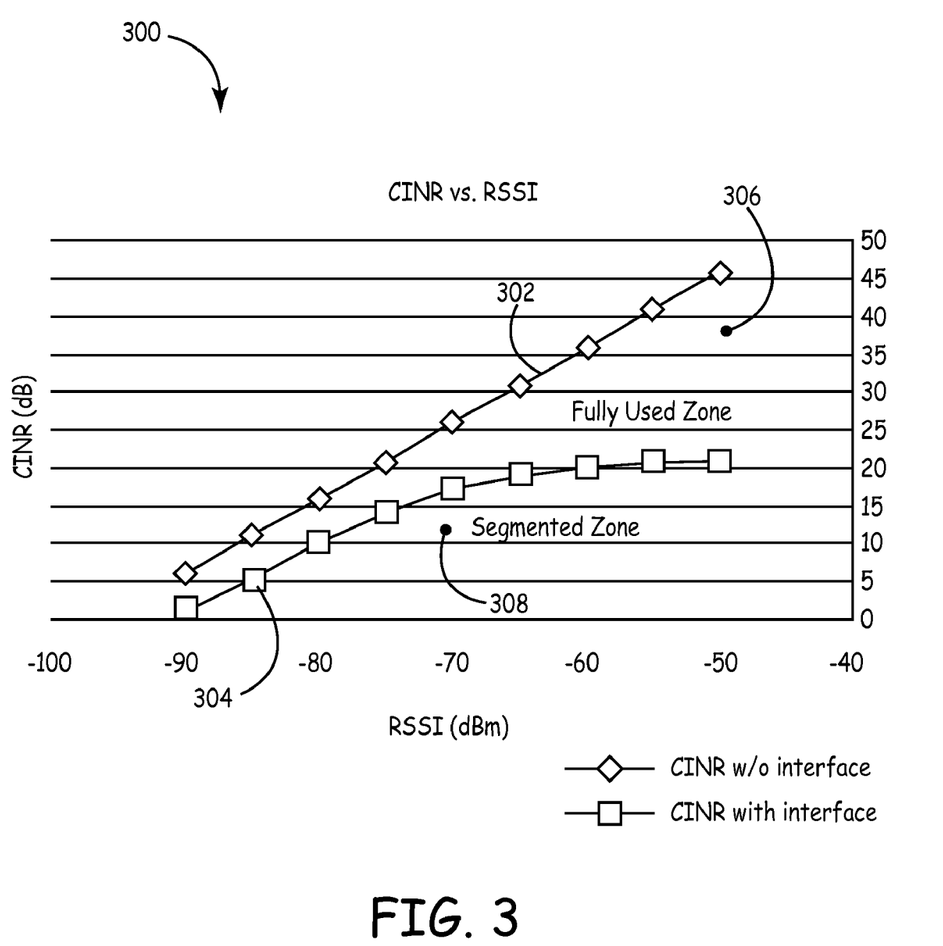
FIG. 3 is a chart showing several curves indicating relationships between CINR and RSSI values.

FIG. 3 provides a chart 300 illustrating an ideal CINR/RSSI function curve 302 and a threshold CINR/RSSI function curve 304. Ideal CINR/RSSI function curve 302 represents the ideal case where mobile station 104A experiences no interference. Ideal CINR/RSSI function curve 302 demonstrates the best case scenario and actual CINR/RSSI values will typically fall below ideal CINR/RSSI function curve 302. Threshold CINR/RSSI function curve 304 indicates the threshold below which requesting mobile stations experience enough interference to be assigned to a segmented zone. That is, if the actual CINR/RSSI value set for a requesting mobile station establishes a point (illustrated at 306, for example) that is greater than the threshold CINR value for the actual RSSI, then the requesting mobile station is assigned to a fully used zone. If the actual CINR/RSSI value set establishes a point (illustrated at 308, for example) that is not greater than the threshold CINR value for the actual RSSI value, then the requesting mobile station is assigned to a segmented zone.

The first actual CINR/RSSI set 306 represents an actual CINR value at an actual RSSI value of a first requesting mobile station while the first requesting mobile station is experiencing relatively little interference. Specifically, the first requesting mobile station has a CINR value of about 38 decibels and an RSSI value of about negative 50 dBm. The first requesting mobile station represented by first actual CINR/RSSI value set 306 is not experiencing enough interference to be assigned to a segmented zone and is thus assigned to a fully used zone. A second actual CINR/RSSI set 308 represents an actual CINR value at an actual RSSI value of a second requesting mobile station while the second requesting mobile station is experiencing a larger relative amount of interference than was the first requesting mobile station. Specifically, the second requesting mobile station has a CINR value of about 12 decibels and an RSSI value of about negative 70 dBm. The second requesting mobile station is experiencing enough interference to be assigned to, and is thus assigned to, a segmented zone. If co-channel interference is present for a particular requesting mobile station, the actual CINR value of the particular requesting mobile station will be lower than the threshold CINR value for the actual RSSI value. Thus, as long as the actual CINR/RSSI function in the fully used zone is better than a threshold CINR/RSSI function in the fully used zone, then the requesting mobile station should be assigned to the fully used zone.

In one embodiment, method 200 is implemented at a base station such as base station 102 of FIG. 1A. For example, method 200 could be implemented in scheduling module 112 of processor 106 of base station 102. Method 200 starts at block 202, with receiving a request to connect to a base station from a mobile station. In one embodiment, the request to connect is relayed to a scheduling module of the base station, such as the scheduling module 112. Method 200 proceeds to block 204, with obtaining an actual CINR/RSSI value set (that is, actual CINR and RSSI values) associated with the requesting mobile station. The actual CINR/RSSI value set is obtained either directly from the requesting mobile station or from databases of CINR values and RSSI values. In one embodiment, the actual CINR and actual RSSI values associated with the requesting mobile station are measured by the requesting mobile station and sent to the base station. In other embodiments, the actual CINR values and actual RSSI values associated with the requesting mobile station may be previously obtained values stored at the base station in separate CINR value and RSSI value databases. In other embodiments, both the CINR values and the RSSI values are stored in the same database or elsewhere, or retrieved in real time upon a connection request from the requesting mobile station.

Method 200 proceeds to block 206, with comparing the actual CINR value to a threshold CINR value for the actual RSSI value, based on the base station's established threshold CINR/RSSI function curve. Method 200 proceeds with determining whether the actual CINR value is greater than the threshold CINR value for the actual RSSI value associated with the requesting mobile station (determined at 208). When the actual CINR/RSSI value set associated with the requesting mobile station has an actual CINR value that is greater than the threshold CINR value located on the threshold CINR/RSSI function curve 304 at the point of the actual RSSI value (determined at 208), then method 200 branches to block 210 with assigning the requesting mobile station to the fully used zone of the base station. This would be the case for CINR/RSSI value set 306, for example. When it is determined at 208 that the actual CINR value is not greater than the threshold CINR value located on the threshold CINR/RSSI function curve 304 at the point of the actual RSSI value (CINR/RSSI value set 308, for example), then method 200 branches to block 212 with assigning the requesting mobile station to a segmented zone of the base station.

As noted above, if there is co-channel interference, the actual CINR value will be lower than the ideal CINR value located on the ideal CINR/RSSI function curve 302 at the point of the actual RSSI value. The difference between the ideal CINR value and the actual CINR value for the actual RSSI value is referred to herein as the CINR/RSSI deviation value. The CINR/RSSI deviation value will not exceed a predetermined CINR/RSSI deviation threshold as long as the actual CINR value does not deviate from the ideal CINR value (given the actual RSSI value) by more than the CINR/RSSI deviation threshold. The requesting mobile station is assigned to the segmented zone if the CINR/RSSI deviation value exceeds the CINR/RSSI deviation threshold. The requesting mobile station is assigned to the fully used zone if the CINR/RSSI deviation value does not exceed the CINR/RSSI deviation threshold. In one embodiment, the predetermined CINR/RSSI deviation threshold is a user configurable parameter.

Figure 4:
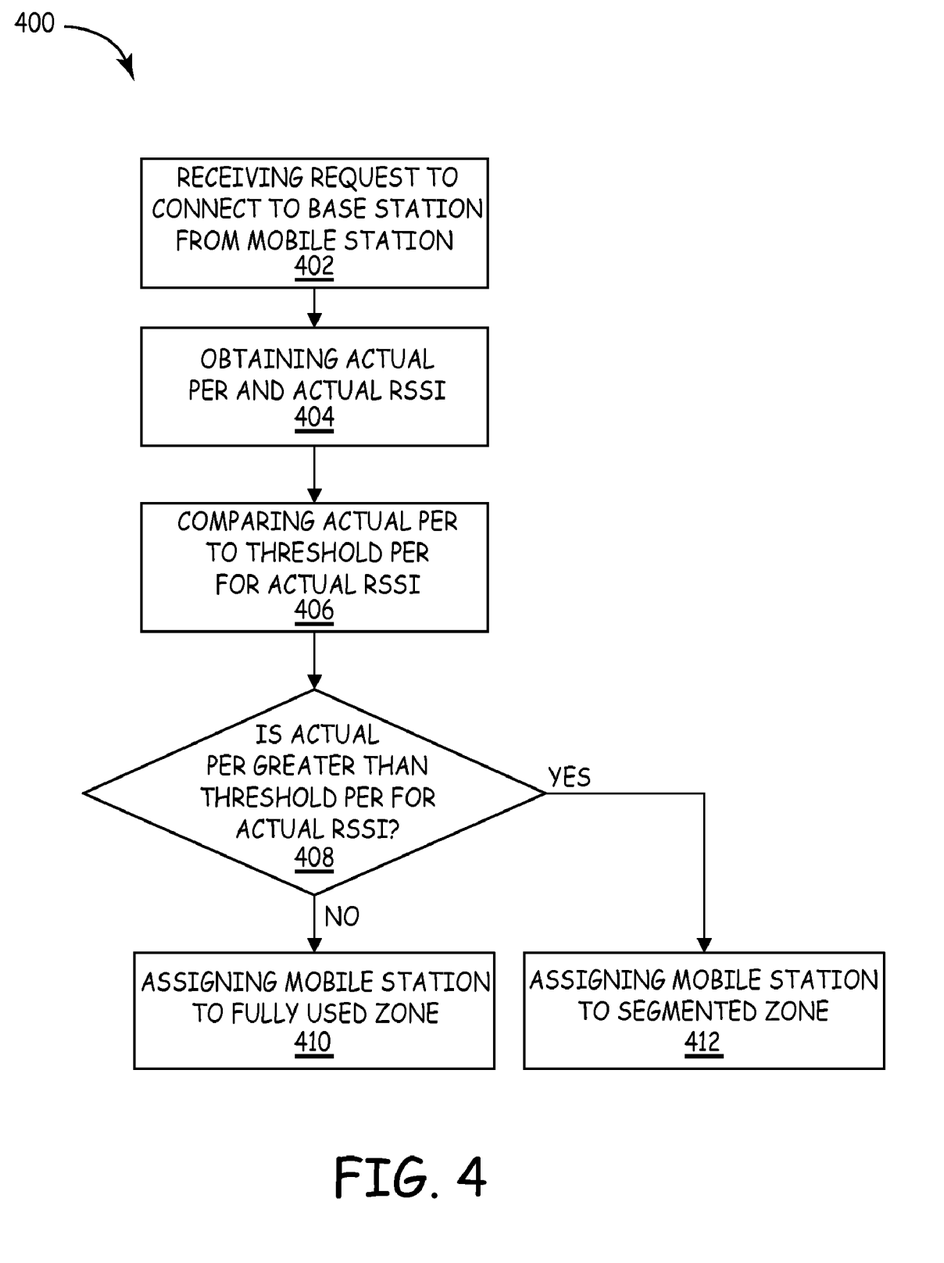
FIG. 4 is a flow diagram showing an example method of assigning mobile stations to either a fully used zone or a segmented zone of a base station using PER percentages combined with RSSI values according to the present disclosure.

FIG. 4 is a flow diagram showing an example method 400 for assigning mobile stations to either a fully used zone or a segmented zone of a base station using PER percentages combined with RSSI values. The PER percentages indicate the percentage of packets sent from the base station to the mobile stations that are not received by the mobile stations. The PER percentages account for the time-varying nature of co-channel interference. Using only RSSI values as a metric, a mobile station is likely to be at a border of a sector if its RSSI value is low. Method 400 utilizes PER percentages and RSSI values as metrics, taking into account the time-varying nature of co-channel interference.

In one embodiment, method 400 is implemented at a base station such as base station 102 of FIG. 1A. For example, method 400 could be implemented in scheduling module 112 of processor 106 of base station 102. Method 400 starts at block 402, with receiving a request to connect to a base station from a mobile station. In one embodiment, the request to connect at a base station is relayed to a scheduling module of the base station, such as the scheduling module 112. Method 400 proceeds to block 404, with obtaining an actual PER/RSSI value set (that is, obtaining an actual PER percentage and an actual RSSI value) associated with the requesting mobile station. The actual PER/RSSI value set is obtained either directly from the requesting mobile station or from databases of PER percentages and RSSI values. In one embodiment, the actual PER percentages and the actual RSSI values associated with the requesting mobile station are determined by the requesting mobile station and sent to the base station. In other embodiments, the actual PER percentages and actual RSSI values associated with the requesting mobile station may be previously obtained values stored at the base station in separate PER percentage and RSSI value databases. In other embodiments, both the PER percentages and the RSSI values are stored in the same database or elsewhere, or retrieved in real time upon a connection request from the requesting mobile station.

Figure 7:
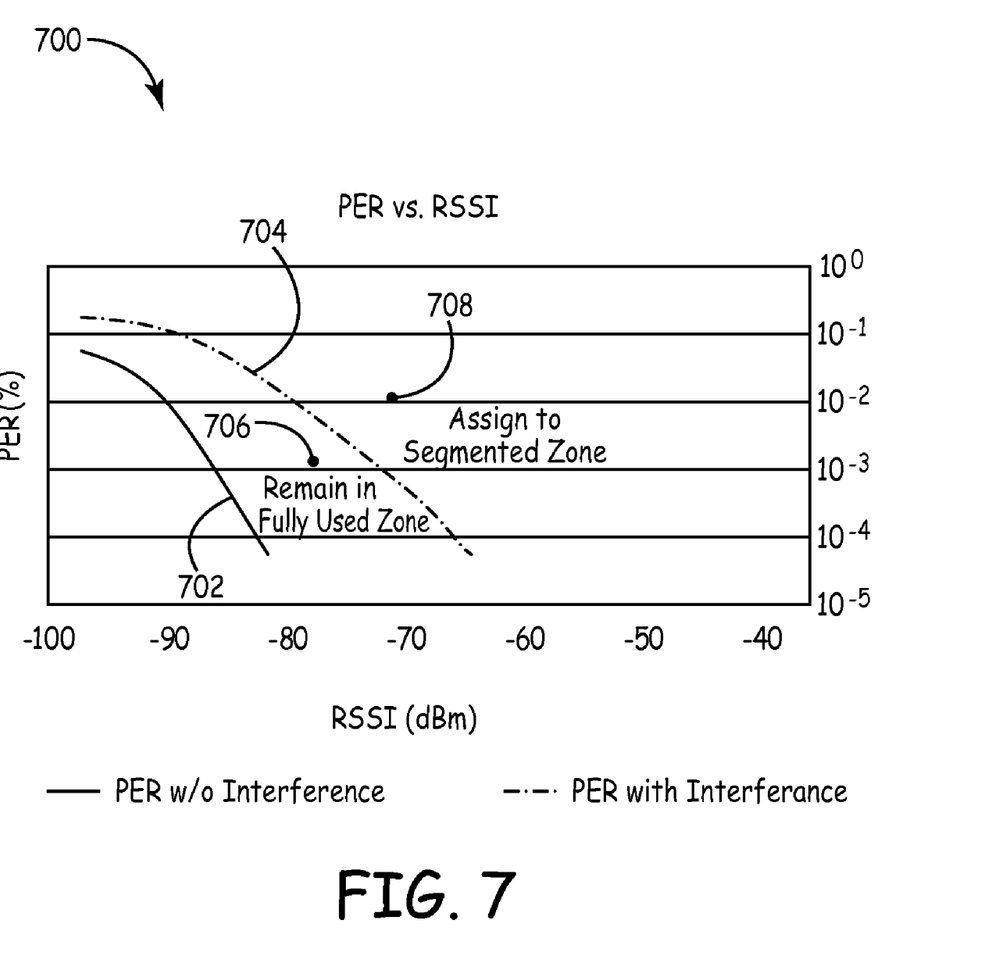
FIG. 7 is a chart showing several curves indicating relationships between PER percentages and RSSI values.

Method 400 proceeds to block 406, with comparing the actual PER percentages to a threshold PER percentage for the actual RSSI value, based on the base station's established threshold PER/RSSI function curve 704 as shown in chart 700 in FIG. 7.

FIG. 7 provides a chart 700 illustrating an ideal PER/RSSI function curve 702 and a threshold PER/RSSI function curve 704. Ideal PER/RSSI function curve 702 represents the ideal case where a mobile station experiences no interference. Ideal PER/RSSI function curve 702 demonstrates the best case scenario and actual PER/RSSI values will typically fall above ideal PER/RSSI function curve 702. Threshold PER/RSSI function curve 704 indicates the threshold above which requesting mobile stations experience enough interference to be assigned to a segmented zone. That is, if the actual PER/RSSI value set for a requesting mobile station establishes a point (illustrated at 706, for example) that is not greater than the threshold PER percentage for the actual RSSI, then the requesting mobile station is assigned to a fully used zone. If the actual PER/RSSI value set establishes a point (illustrated at 708, for example) that is greater than the threshold PER percentage for the actual RSSI value, then the requesting mobile station is assigned to a segmented zone.

Threshold PER percentages for various RSSI values is typically also stored in a database. The PER percentages are expressed as percentages and the RSSI values are typically referenced in dBm. Method 400 proceeds with determining whether the actual PER percentage for the actual RSSI value associated with the requesting mobile station is greater than the threshold PER percentages for the actual RSSI value (determined at 408). When the actual PER/RSSI value set associated with requesting mobile station has an actual PER percentage that is not greater than the threshold PER percentage for the actual RSSI value (determined at 408), then method 400 branches to block 410 with assigning the requesting mobile station to the fully used zone of the base station. When it is determined at 408 that the actual PER percentage is greater than the threshold PER percentage for the actual RSSI value, then method 400 branches to block 412 with assigning the requesting mobile station to a segmented zone of the base station.

As an example, assume a threshold PER percentage is defined to be 10 percent for an actual RSSI level of −92 dBm in the downlink. Further assume that QPSK modulation and coding is used. If the actual PER percentage is greater than the threshold PER percentage of about 10 percent at an actual RSSI level of −92 dBm, then co-channel interference is the most likely reason and the requesting mobile station is assigned to the segmented zone of the base station. If the actual PER percentage is not greater than the threshold PER percentage of about 10 percent at an RSSI level of −92 dBm, then co-channel interference is not the most likely reason and the requesting mobile station is assigned to the fully used zone of the base station.

In example embodiments using adaptive modulation and coding (AMC), mobile stations are typically assigned a modulation and coding based on the actual CINR values for the actual RSSI values according to method 200. Embodiments using AMC are able to switch between various modulation and coding, such as QAM (including, but not limited to QAM64 ½, QAM16 ¾, and QAM 16 ½), and QPSK (including, but not limited to QPSK ½). In example embodiments where the results of method 200 do not provide adequate PER percentages for the requesting mobile station, the co-channel interference is possibly intermittent and not showing up using the CINR/RSSI metric used in method 200 due to the effects of averaging. In this case, the base station assigns the requesting mobile station to the segmented zone simply due to generally high PER percentages for the actual RSSI values based on the results of method 400. A method combining method 200 and method 400 is discussed below.

Figure 5:
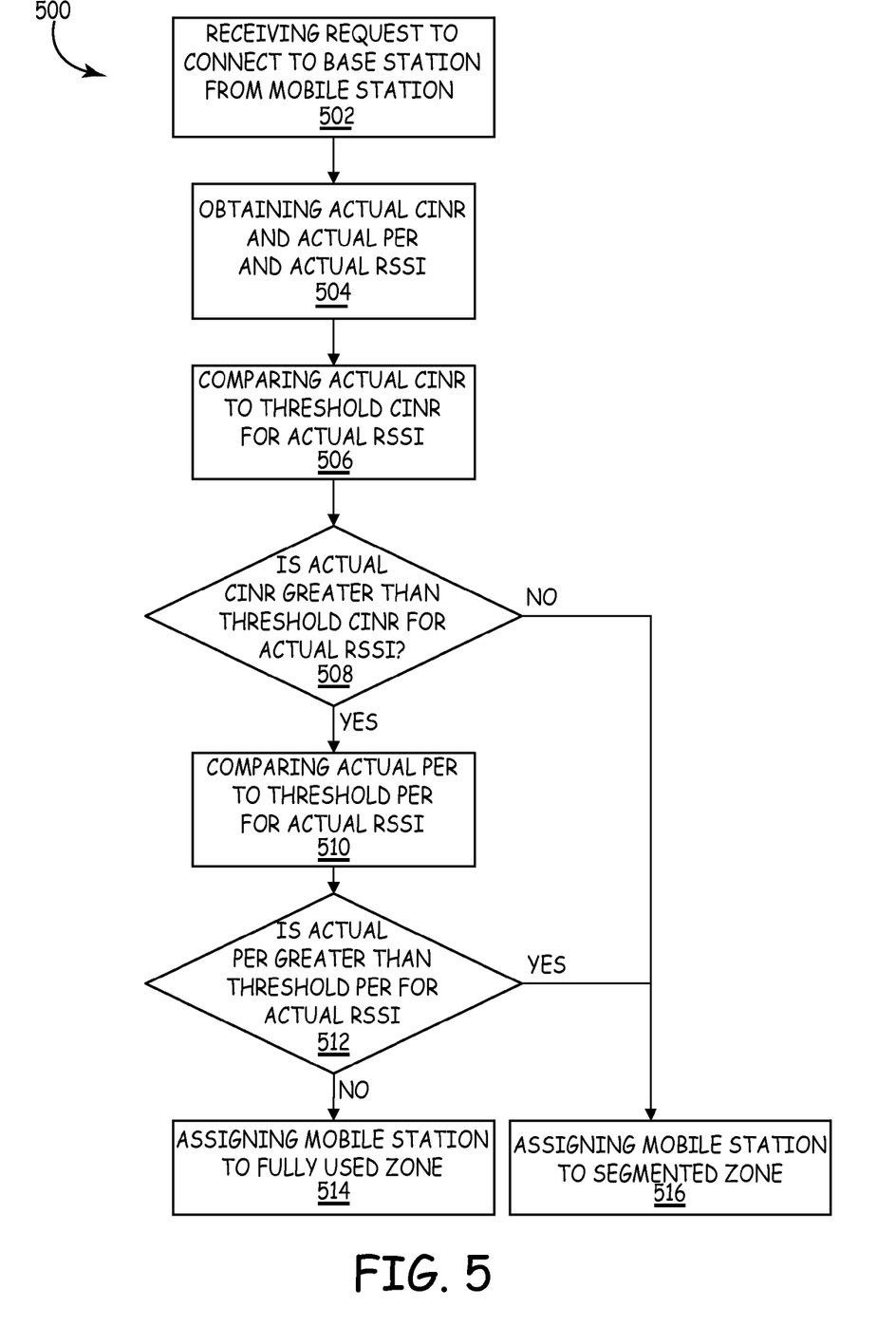
FIG. 5 is a flow diagram showing an example method of assigning mobile stations to either a fully used zone or a segmented zone of a base station using either CINR values combined with RSSI values or PER percentages combined with RSSI values according to the present disclosure.

FIG. 5 is a flow diagram showing an example method 500 for assigning mobile stations to either a fully used zone or a segmented zone of a base station based on a comparison of either the function of CINR values combined with RSSI values or PER percentages combined with RSSI values. Method 500 combines aspects of method 200 and aspects of method 400, so that either falling at or below the CINR/RSSI threshold of method 200 or falling above the PER/RSSI threshold of method 400 is sufficient to assign a requesting mobile station into a segmented zone of the base station.

In one embodiment, method 500 is implemented at a base station such as base station 102 of FIG. 1A. For example, method 500 could be implemented in scheduling module 112 of processor 106 of base station 102. Method 500 starts at block 502, with receiving a request to connect at a base station from a mobile station. In one embodiment, the request to connect is relayed to a scheduling module of the base station, such as scheduling module 112. Method 500 proceeds to block 504, with obtaining an actual CINR/RSSI value set (that is, actual CINR and RSSI values) and an actual PER/RSSI value set (that is, actual PER and RSSI values) associated with the requesting mobile station. The actual CINR/RSSI value set and actual PER/RSSI value set are obtained either directly from the requesting mobile station or from databases of CINR values, RSSI values, and PER percentages. In one embodiment, the actual CINR values, the actual RSSI values, and the actual PER percentages associated with the requesting mobile station are determined by the requesting mobile station and sent to the base station. In other embodiments, the actual CINR values, the actual RSSI values, and the actual PER percentages associated with the requesting mobile station may be previously obtained values stored at the base station in separate CINR value, RSSI value, and PER percentage databases. In other embodiments, the CINR values, the RSSI values, and the PER percentages are stored in the same database or elsewhere, or retrieved in real time upon a connection request from the requesting mobile station.

Method 500 proceeds to block 506, with comparing the actual CINR value to a threshold CINR value for the actual RSSI, based on the base station's established threshold CINR/RSSI function curve (such as illustrated in FIG. 3, for example). Method 500 proceeds with determining whether the actual CINR value for the actual RSSI value associated with the requesting mobile station is greater than the threshold CINR value for the actual RSSI value (determined at 508). When the actual CINR/RSSI value set associated with the requesting mobile station has an actual CINR value that is greater than the threshold CINR value for the actual RSSI value (CINR/RSSI value set 306, for example), then method 500 branches to block 510, with comparing the actual PER percentage to a threshold PER percentage for the actual RSSI, based on the base station's established PER/RSSI function curve.

Method 500 proceeds to 512 with determining whether the actual PER percentage is greater than the threshold PER percentage for the actual RSSI value associated with the requesting mobile station based on the base station's established threshold PER/RSSI function curve (such as illustrated in FIG. 7, for example). When the actual PER/RSSI value set associated with the requesting mobile station has an actual PER percentage that is not greater than the threshold PER percentage for the actual RSSI value, then method 500 branches to block 514, with assigning the requesting mobile station to the fully used zone of the base station. When it is determined at block 512 that the actual PER percentage is greater than the threshold PER percentage for the actual RSSI value, then method 500 branches to block 516, with assigning the requesting mobile station to a segmented zone of the base station. When the actual CINR value is not greater than the threshold CINR value for the actual RSSI value associated with the requesting mobile station (determined at 508; CINR/RSSI value set 308, for example), then method 200 branches to block 516, with assigning the requesting mobile station to a segmented zone of the base station.

Figure 6:
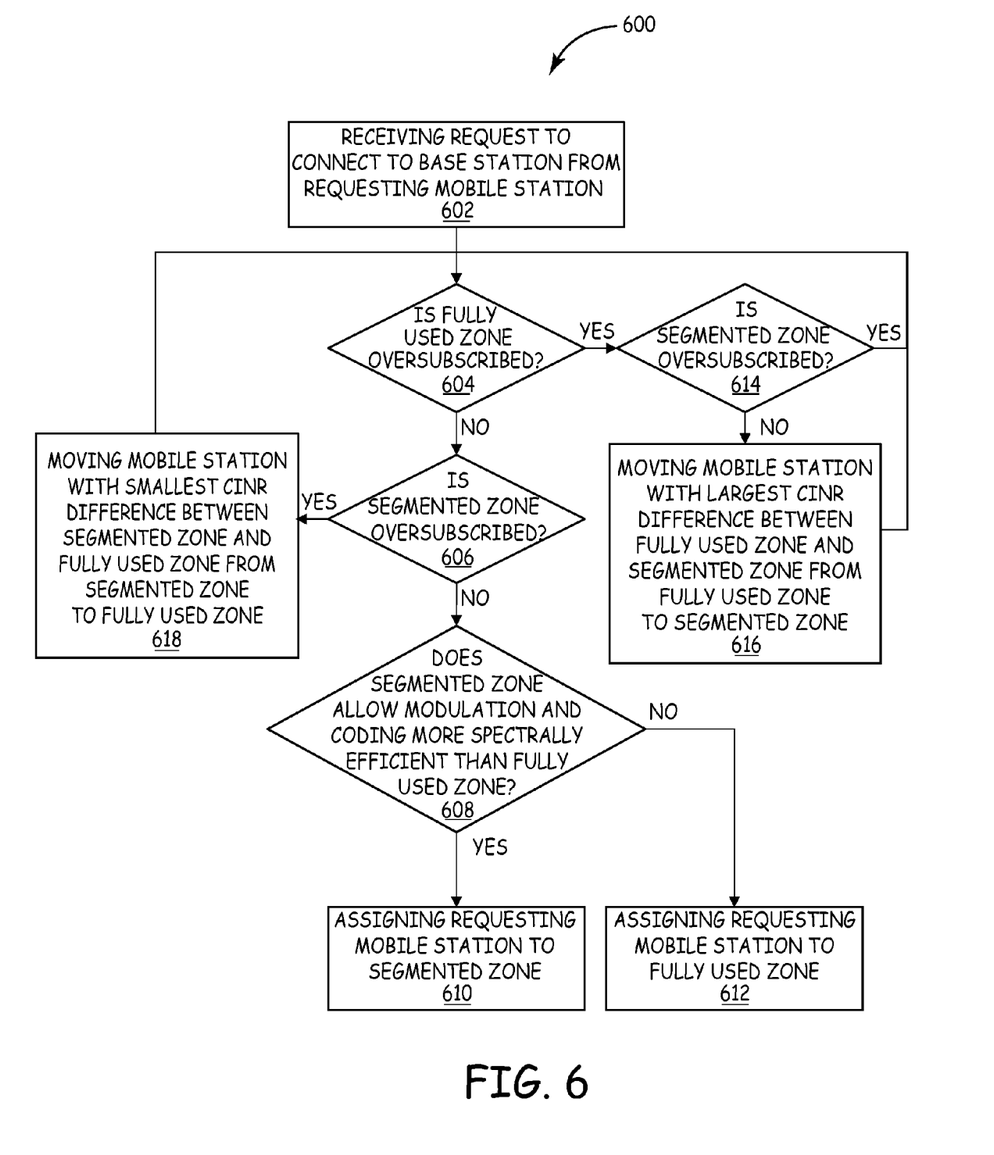
FIG. 6 is a flow diagram showing an example method of managing mobile station assignments on a base station between a fully used zone and a segmented zone.

FIG. 6 is a flow diagram showing an example method of managing mobile station assignments on a base station between a fully used zone and a segmented zone. In one embodiment, method 600 is implemented at a base station, such as base station 102 of FIG. 1A. For example, method 600 could be implemented in scheduling module 112 of processor 106 of base station 102. Method 600 starts at block 602, with receiving a request to connect at a base station from a requesting mobile station, such as mobile station 104A. In one embodiment, the request to connect is relayed to a scheduling module of the base station, such as scheduling module 112.

Method 600 compares the utilization of the fully used zone to the utilization of a segmented zone. If the segmented zone is over-utilized, it may be more spectrally efficient to remain in the fully used zone and use a lower efficiency modulation and coding than to move to the segmented zone and use a higher efficiency modulation and coding. This is because the performance increase associated with higher efficiency modulation and coding is sometimes offset by the reduction in sub-channels available to a particular mobile station when it switches from the fully used zone to a segmented zone. Still, deciding to assign a requesting mobile station to the fully used zone while using a lower efficiency modulation and coding increases the likelihood that if co-channel interference is experienced at a particular requesting mobile station, the particular requesting mobile station may be interfering in the uplink with an adjacent base station from which it is experiencing downlink interference. In this case, the uplink data from the particular requesting mobile station could be sent via the segmented zone even if the downlink data is sent in the fully used zone.

Method 600 proceeds to block 604, with determining whether the fully used zone of the base station is oversubscribed. The determination of whether the fully used zone is oversubscribed is based on the number of mobile stations subscribed to the fully used zone. The fully used zone is oversubscribed when there is no available capacity in the fully used zone for any additional mobile station subscribers. In one embodiment, the fully used zone of the base station is deemed oversubscribed when more mobile stations need allocation to the fully used zone than the fully used zone can accommodate. In one embodiment, oversubscription is determined based on a threshold percentage of the fully used zone's bandwidth.

When it is determined at 604 that the fully used zone is not oversubscribed, then method 600 branches to block 606, with determining whether the segmented zone is oversubscribed. Similar to the determination at 604, the determination at 606 is based on the number of mobile stations subscribed to a segmented zone, such as segmented zone 126. The segmented zone is oversubscribed when there is no available capacity in the segmented zone for any additional mobile station subscribers. In one embodiment, the segmented zone of the base station is deemed oversubscribed when more mobile stations need allocation to the segmented zone than the fully used zone can accommodate. In one embodiment, oversubscription is determined based on a threshold percentage of the segmented zone's bandwidth.

When it is determined at 606 that the segmented zone is not oversubscribed, then method 600 branches to block 608, with determining whether the segmented zone allows modulation and coding more spectrally efficient than the fully used zone. The segmented zone allow modulation and coding more spectrally efficient than the fully used zone when the modulation and coding supported by the current operating conditions is more spectrally efficient than the fully used zone. The base station and mobile stations are typically capable of adaptive modulation and coding (AMC), such that the type of modulation and coding changes based on the quality of the radio link between the base station and the mobile stations. Because there is typically less co-channel interference in the segmented zone than in the fully used zone, in some cases switching the mobile station experiencing co-channel interference in the fully used zone to the segmented zone, where it does not experience as much co-channel interference, allows a more efficient modulation and coding to be used. The relative spectral efficiency improvements between switching zones, which can be readily determined by one of ordinary skill in the art upon reading this specification, is typically taken into account. For example, a 6 decibel improvement in CINR by switching from QPSK ½ to QAM16 ½ will double the spectral efficiency from 1 bit per Hertz to 2 bits per Hertz. An additional 6 decibel improvement in CINR by switching from QAM16 ½ will only provide a 50 percent additional improvement in spectral efficiency from 2 bits per Hertz to 3 bits per Hertz. In this case, moving a mobile station into an oversubscribed zone with fewer sub-channels to switch to a modulation and coding with a 50 percent spectral efficiency increase may not improve the overall spectral efficiency of the base station.

When it is determined at 608 that the segmented zone allows modulation and coding that is more spectrally efficient than the fully used zone, method 600 branches to block 610, with assigning the requesting mobile station to the segmented zone. When it is determined at 608 that the segmented zone does not allow modulation and coding that is more spectrally efficient than the fully used zone, method 600 branches to block 612, with assigning the requesting mobile station to the fully used zone.

When it is determined at 604 that the fully used zone is oversubscribed, method 600 branches to block 614, with determining whether the segmented zone is oversubscribed. When it is determined at 614 that the segmented zone is not oversubscribed, method 600 branches to block 616, with moving the currently subscribed mobile station with the largest CINR difference between the fully used zone and the segmented zone from the fully used zone to the segmented zone. Method 600 then returns to block 604. In example embodiments, method 600 will continue to go from block 604 to block 614, from block 614 to block 616, and from block 616 back to block 604, until the fully used zone is no longer oversubscribed. This loop helps to balance the subscription to the segmented zone with the subscription to the fully used zone by moving subscribers from the oversubscribed segmented zone to the non-oversubscribed fully used zone until the segmented zone is no longer oversubscribed.

When it is determined at 614 that the segmented zone is oversubscribed, method 600 branches and returns to block 604. In this case, because both the fully used zone and the segmented zone are oversubscribed, there is no room for the requesting mobile station to be assigned to either the fully used zone or the segmented zone. In example embodiments, once another current subscriber unsubscribes from the base station, then the requesting mobile station is able to subscribe to the base station. In some embodiments, the base station communicates with neighboring base stations to balance the load between the base stations by handing off subscribers that could subscribe to either of two base stations from the oversubscribed base station to the not oversubscribed base station.

When it is determined at 606 that the segmented zone is oversubscribed, method 600 branches to block 618, with moving the currently subscribed mobile station with the smallest CINR difference between the fully used zone and the segmented zone from the segmented zone to the fully used zone. Method 600 then returns to block 604. In example embodiments, method 600 will continue to go from block 604 to block 606, from block 606 to block 618, and from block 618 back to block 604 until the segmented zone is no longer oversubscribed. This loop helps to balance the fully used zone with the segmented zone by moving subscribers from the oversubscribed fully used zone to the segmented zone until the fully used zone is no longer oversubscribed. In one embodiment, when both the fully used zone and the segmented zone are oversubscribed, the mobile station is denied access.

In example embodiments, the decision of whether to assign a requesting mobile station to the fully used zone or the segmented zone is done by first measuring the CINR values for the preamble or pilots in both the fully used zone and in one of the three segments in the segmented zone. Typically these CINR measurements are taken over multiple time periods because of the time varying nature of co-channel interference. Second, the average CINR values from all of the preamble or pilots in the fully used zone is subtracted from the average CINR values from the preamble or pilots associated with the one specific segment of the segmented zone. The difference in CINR values between the fully used zone and the one segment of the segmented zone indicates the potential improvement in CINR values that could be anticipated when mobile station data is assigned to the one specific segment in segmented zone 126 instead of the fully used zone. When the CINR is monitored over multiple time periods, a standard deviation or a lowest (poorest) CINR is typically calculated over a specified time or set of measurements.

Generally, the methods used to decide whether to assign a requesting mobile station to a fully used zone or a segmented zone, including method 200, method 400, method 500, and method 600, are designed to maximize the channel spectral efficiency. However, example embodiments of these methods are further modified to not assign mobile stations to either the fully used zone or the segmented zone when the minimum guaranteed service level, measured as throughput per mobile station, cannot be satisfied in that zone, even if the overall channel spectral efficiency is improved. Typically, the downlink parameters, as measured by the mobile station, should be used in the methods described rather than the uplink values because uplink co-channel interference will occur with any of the mobile stations' transmissions independent of distance from the base station. Therefore, the uplink measurements are not ideal for sorting the mobile stations.

Another refinement of method 200, method 400, method 500, and method 600, includes assigning mobile stations not meeting the thresholds for CINR/RSSI or PER/RSSI to segmented zones quickly, but allowing those same mobile stations to periodically be returned to the fully used zone to test whether the current CINR/RSSI and PER/RSSI in the fully used zone subsequently meet the thresholds for CINR/RSSI and PER/RSSI in the fully used zone. Alternatively, measurements of CINR values, RSSI values, and PER percentages can be taken on the preamble, pilot, or other non-data bursts to test whether the CINR/RSSI and PER/RSSI in the fully used zone meet the thresholds for CINR/RSSI and PER/RSSI in the fully used zone without requiring the mobile stations being tested to use non-segmented data bursts subject to co-channel interference. In general, a poor PER percentage may be used to assign a subscribed mobile station to a segmented zone, but not to move the subscribed mobile station back to a non-segmented zone. Instead, CINR values from the preamble of the subscribed mobile station enabling a CINR/RSSI in the fully used zone to meet the threshold CINR/RSSI could be used to move the subscribed mobile station back to a non-segmented zone.

In example embodiments, processor 106 includes one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). Processor 106 includes or functions with software programs, firmware, or other computer readable instructions for carrying out various process tasks, calculations, and control functions, used in the method of prompting a pilot and/or flight crew to respond to a data link message before it expires. These instructions are typically tangibly embodied on any appropriate medium used for storage of computer readable instructions or data structures. In some embodiments, system 100 includes a plurality of processors.

Memory 108 can be implemented using any available computer readable storage media accessible by a general purpose or a special purpose computer or processor, or any programmable logic device. Suitable computer readable media include storage or memory media such as magnetic or optical media. Storage or memory media include, but is not limited to, conventional hard disks, Compact Discs (CDs) (including, but not limited to, CD-ROM, CD-R, CD-RW, and the like), Digital Versatile Discs (DVDs) (including, but not limited to, DVD-ROM, DVD-R, DVD-RW, DVD+R, DVD+RW, DVD-RAM, and the like), Blu-ray Discs (including, but not limited to, Blu-ray Disc Recordable (BD-R) and Blu-ray Disc Recordable/Erasable (BD-RE), and the like), High Definition/Density Digital Versatile Discs (HD DVDs) (including, but not limited to HD DVD-ROM, HD DVD-R, HD DVD-RW, HD DVD-RAM, and the like), other optical media, volatile or non-volatile media such as Random Access Memory (RAM) (including, but not limited to, Synchronous Dynamic Random Access Memory (SDRAM), Double Data Rate (DDR) RAM, and RAMBUS Dynamic RAM (RDRAM), Static RAM (SRAM)), Read Only Memory (ROM), Electrically Erasable Programmable ROM (EEPROM), flash memory, and the like.) Suitable processor-readable media may also include transmission media such as electrical, electromagnetic, or digital signals, conveyed via a communication medium such as a wired network and/or a wireless network. Combinations of the above are also included within the scope of computer readable media. In some embodiments, system 100 includes a plurality of memories.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A base station comprising:
a transceiver providing communication with a plurality of mobile stations;
a memory storing a first database of threshold CINR (carrier to interference noise ratio) values based on a threshold CINR/RSSI (carrier to interference noise ratio/received signal strength indication) function curve; and
a processor coupled to the transceiver and the memory, the processor implementing a scheduling module;
wherein when the transceiver receives a request to connect from a first mobile station of the plurality of mobile stations, the scheduling module obtains an actual CINR value and an actual RSSI value for the first mobile station;
wherein the scheduling module compares the actual CINR value with a threshold CINR value retrieved from the first database based on the actual RSSI value;
wherein when the actual CINR value is greater than the threshold CINR value for the actual RSSI value, the scheduling module assigns the mobile station one or more subcarriers from a fully used zone of subcarriers; and
wherein when the actual CINR value is not greater than the threshold CINR value for the actual RSSI value, the scheduling module assigns the mobile station one or more subcarriers from a segmented zone of subcarriers.

2. The base station of claim 1, wherein the segmented zone of subcarriers is divided into a first segment of subcarriers, a second segment of subcarriers, and a third segment of subcarriers.

3. The base station of claim 1, wherein the scheduling module determines which subcarriers are within the segmented zone and which subcarriers are within the fully used zone based on one or more of relative CINR values and relative RSSI values for the plurality of mobile stations.

4. The base station of claim 1, wherein the memory further stores a second database providing at least one of actual CINR values associated with the plurality of mobile stations and actual RSSI values associated with the plurality of mobile stations.

5. The base station of claim 1, wherein the transceiver providing communication with the plurality of mobile stations uses orthogonal frequency division multiple access.

6. The base station of claim 1, further comprising:
wherein the memory stores a second database of threshold PER (packet error rate) percentages based on a threshold PER/RSSI function curve;
wherein when the transceiver receives the request to connect from a first mobile station of the plurality of mobile stations, the scheduling module obtains an actual PER percentage for the first mobile station;
wherein the scheduling module compares the actual PER percentage with a threshold PER percentage retrieved from the first database based on the actual RSSI value;
wherein when the actual CINR value is greater than the threshold CINR value for the actual RSSI value, the scheduling module assigns the mobile station one or more subcarriers from a fully used zone of subcarriers, when the actual PER percentage is not greater than the threshold PER percentage for the actual RSSI value; and wherein when the actual PER percentage is greater than the threshold PER percentage for the actual RSSI value, the scheduling module assigns the mobile station one or more subcarrier from a segmented zone of subcarriers.

7. A method of selectively assigning subcarriers to a mobile station, the method comprising:
receiving a request to connect to a base station from a mobile station;
obtaining an actual CINR (carrier to interference noise ratio) value and an actual RSSI (received signal strength indication) value for the mobile station;
comparing the actual CINR value with a threshold CINR value, wherein the threshold CINR value is based on the actual RSSI value for the mobile station;
when the actual CINR value is greater than the threshold CINR value for the actual RSSI value, assigning the mobile station to a fully used zone of subcarriers; and
when the actual CINR value is not greater than the threshold CINR value for the actual RSSI value, assigning the mobile station to a segmented zone of subcarriers.

8. The method of claim 7, wherein obtaining an actual CINR value and an actual RSSI value for the mobile station further comprises obtaining at least one of the actual CINR value and the actual RSSI value from a database.

9. The method of claim 7, wherein the threshold CINR value is retrieved from a database based on the actual RSSI value.

10. The method of claim 7, further comprising:
obtaining an actual PER (packet error rate) percentage for the mobile station;
comparing the actual PER percentage with a threshold PER percentage, wherein the threshold PER percentage is based on the actual RSSI value for the mobile station;
when the actual CINR value is greater than the threshold CINR value for the actual RSSI value, assigning the mobile station to a fully used zone of subcarriers, when the actual PER percentage is greater than the threshold PER percentage for the actual RSSI value; and
when the actual PER percentage is not greater than the threshold PER percentage for the actual RSSI value, assigning the mobile station to a segmented zone of subcarriers.

11. A base station comprising:
a transceiver providing communication with a plurality of mobile stations;
a memory storing a first database of threshold PER (packet error rate) percentage based on a threshold PER/RSSI (packet error rate/received signal strength indication) function curve; and
a processor coupled to the transceiver and the memory, the processor implementing a scheduling module;
wherein when the transceiver receives a request to connect from a first mobile station of the plurality of mobile stations, the scheduling module obtains an actual PER percentage and an actual RSSI value for the first mobile station;
wherein the scheduling module compares the actual PER percentage with a threshold PER percentage retrieved from the first database based on the actual RSSI value;
wherein when the actual PER percentage is not greater than the threshold PER percentage for the actual RSSI value, the scheduling module assigns the mobile station one or more subcarriers from a fully used zone of subcarriers; and
wherein when the actual PER percentage is greater than the threshold PER percentage for the actual RSSI value, the scheduling module assigns the mobile station one or more subcarriers from a segmented zone of subcarriers.

12. The base station of claim 11, wherein the segmented zone of subcarriers is divided into a first segment of subcarriers, a second segment of subcarriers, and a third segment of subcarriers.

13. The base station of claim 11, wherein the scheduling module determines which subcarriers are within the segmented zone and which subcarriers are within the fully used zone based on one or more of relative PER percentages and relative RSSI values for the plurality of mobile stations.

14. The base station of claim 11, wherein the memory further stores a second database providing at least one of actual CINR (carrier to interference noise ratio) values associated with the plurality of mobile stations and actual RSSI values associated with the plurality of mobile stations.

15. The base station of claim 11, wherein the transceiver providing communication with the plurality of mobile stations uses orthogonal frequency division multiple access.

16. The base station of claim 11, further comprising:
wherein the memory stores a second database of threshold CINR (carrier to interference noise ratio) values based on a threshold CINR/RSSI function curve;
wherein when the transceiver receives the request to connect from a first mobile station of the plurality of mobile stations, the scheduling module obtains an actual CINR value for the first mobile station;
wherein the scheduling module compares the actual CINR value with a threshold CINR value retrieved from the first database based on the actual RSSI value;
wherein when the actual PER percentage is not greater than the threshold PER percentage for the actual RSSI value, the scheduling module assigns the mobile station one or more subcarriers from a fully used zone of subcarriers, when the actual CINR value is greater than the threshold CINR value for the actual RSSI value; and
wherein when the actual CINR value is not greater than the threshold CINR value for the actual RSSI value, the scheduling module assigns the mobile station one or more subcarrier from a segmented zone of subcarriers.

17. A method of selectively assigning subcarriers to a mobile station, the method comprising:
receiving a request to connect to a base station from a mobile station;
obtaining an actual PER (packet error rate) percentage and an actual RSSI (received signal strength indication) value for the mobile station;
comparing the actual PER percentage with a threshold PER percentage, wherein the threshold PER percentage is based on the actual RSSI value for the mobile station;
when the actual PER percentage is greater than the threshold PER percentage for the actual RSSI value, assigning the mobile station to a fully used zone of subcarriers; and
when the actual PER percentage is not greater than the threshold PER percentage for the actual RSSI value, assigning the mobile station to a segmented zone of subcarriers.

18. The method of claim 17, wherein obtaining an actual PER percentage and an actual RSSI value for the mobile station further comprises obtaining at least one of the actual PER percentage and the actual RSSI value from a database.

19. The method of claim 17, wherein the threshold PER percentage is retrieved from a database based on the actual RSSI value.

20. The method of claim 17, further comprising:
obtaining an actual CINR (carrier to interference noise ratio) value for the mobile station;
comparing the actual CINR value with a threshold CINR value, wherein the threshold CINR value is based on the actual RSSI value for the mobile station;
when the actual PER percentage is greater than the threshold PER percentage for the actual RSSI value, assigning the mobile station to a fully used zone of subcarriers, when the actual CINR value is greater than the threshold CINR value for the actual RSSI value; and
when the actual CINR value is not greater than the threshold CINR value for the actual RSSI value, assigning the mobile station to a segmented zone of subcarriers.

* * * * *